(12) United States Patent
O'Kelley et al.

(10) Patent No.: US 9,197,842 B2
(45) Date of Patent: *Nov. 24, 2015

(54) VIDEO APPARATUS AND METHOD FOR IDENTIFYING AND COMMISSIONING DEVICES

(71) Applicant: FABRIQ, LTD., Boulder, CO (US)

(72) Inventors: Matthew B. O'Kelley, Boulder, CO (US); Jeffrey E. Mast, Loveland, CO (US); Jeffrey G. Reh, Longmont, CO (US)

(73) Assignee: FABRIQ, LTD., Boulder, CO (US)

( * ) Notice: Subject to any disclaimer, the term of this patent is extended or adjusted under 35 U.S.C. 154(b) by 23 days.

This patent is subject to a terminal disclaimer.

(21) Appl. No.: 13/946,718

(22) Filed: Jul. 19, 2013

(65) Prior Publication Data

US 2014/0023335 A1    Jan. 23, 2014

Related U.S. Application Data

(60) Provisional application No. 61/673,315, filed on Jul. 19, 2012, provisional application No. 61/811,562, filed on Apr. 12, 2013.

(51) Int. Cl.
*H04N 5/765* (2006.01)
*H04L 12/24* (2006.01)

(52) U.S. Cl.
CPC ............ *H04N 5/765* (2013.01); *H04L 41/0806* (2013.01)

(58) Field of Classification Search
CPC ............................ H04L 41/0806; H04N 5/765
See application file for complete search history.

(56) References Cited

U.S. PATENT DOCUMENTS

| | | |
|---|---|---|
| 7,020,701 B1 | 3/2006 | Gelvin et al. |
| 7,307,542 B1 | 12/2007 | Chandler et al. |
| 7,382,271 B2 | 6/2008 | McFarland |
| 7,400,594 B2 | 7/2008 | Pereira et al. |
| 7,623,042 B2 | 11/2009 | Huizenga |
| 7,889,051 B1 | 2/2011 | Billig et al. |
| 7,925,384 B2 | 4/2011 | Huizenga et al. |
| 7,953,327 B2 | 5/2011 | Pereira et al. |
| 8,049,434 B2 | 11/2011 | Crouse et al. |
| 8,159,156 B2 | 4/2012 | Henig et al. |
| 8,264,168 B2 | 9/2012 | Feri et al. |
| 8,265,674 B2 | 9/2012 | Choong et al. |
| 8,290,437 B2 | 10/2012 | Simons et al. |
| 8,373,362 B2 | 2/2013 | Chemel et al. |
| 8,422,401 B1 | 4/2013 | Choo-Choong et al. |
| 2007/0121648 A1 | 5/2007 | Hahn |
| 2008/0030075 A1 | 2/2008 | Stanley et al. |
| 2009/0026966 A1 | 1/2009 | Budde et al. |

(Continued)

*Primary Examiner* — Thai Tran
*Assistant Examiner* — Stephen Smith
(74) *Attorney, Agent, or Firm* — Huffman Patent Group, LLC (57) ABSTRACT

An apparatus for concurrently identifying and commissioning devices including a video recording device and a gateway device. The video recording device records and processes video images of the devices, and determines identification information and a geolocation corresponding to each of the devices, where the geolocation is determined by combining known coordinates and dimensions of an object within the video images, and a location of each of the devices relative to the video recording device, and where the video images comprise unique encoded luminous transmissions simultaneously transmitted from the each of the devices. The gateway device is coupled to the video recording device and the devices, and the identification information, and commissions the each of the devices onto a network.

21 Claims, 7 Drawing Sheets

(56) References Cited

U.S. PATENT DOCUMENTS

| | | |
|---|---|---|
| 2009/0045939 A1 | 2/2009 | Holland et al. |
| 2009/0066473 A1 | 3/2009 | Simons |
| 2010/0271476 A1* | 10/2010 | Damink ............... H05B 37/029 348/135 |
| 2011/0043116 A1 | 2/2011 | Schenk et al. |
| 2011/0090042 A1 | 4/2011 | Leonard et al. |
| 2011/0199004 A1* | 8/2011 | Henig ................ H05B 37/0218 315/152 |
| 2012/0068822 A1 | 3/2012 | Sheikman et al. |
| 2012/0194083 A1 | 8/2012 | Henig et al. |
| 2012/0242231 A1 | 9/2012 | Yianni et al. |
| 2012/0253540 A1* | 10/2012 | Coyne ................... G05B 15/02 700/297 |
| 2013/0002863 A1* | 1/2013 | Jia ........................ G06K 9/6264 348/143 |
| 2013/0147366 A1* | 6/2013 | Huizenga ........... H05B 37/0272 315/152 |
| 2013/0181609 A1* | 7/2013 | Agrawal ................ H05B 37/03 315/152 |
| 2013/0272223 A1* | 10/2013 | Mathews ............... H04W 76/02 370/329 |
| 2013/0332995 A1* | 12/2013 | Bultman ................. G06F 21/36 726/4 |
| 2014/0300276 A1* | 10/2014 | Wang ................. H04L 12/2807 315/151 |

* cited by examiner

FIG. 1 (Prior Art)

INSTALLATION OF A UNCOMMISSIONED DEVICES

DEVICE IDENTIFICATION AND COMMISSIONING

FIG. 7

DEVICE IDENTIFICATION AND COMMISSIONING SCREEN SHOT

FIG. 8

DEVICE IDENTIFICATION, LOCATING, AND COMMISSIONING

FIG. 9

DEVICE IDENTIFICATION, LOCATING, AND COMMISSIONING SCREEN SHOT

FIG. 10

DEVICE IDENTIFICATION, LOCATING, AND COMMISSIONING USING KNOWN POINTS

FIG. 11

DEVICE IDENTIFICATION, LOCATING, AND COMMISSIONING SCREEN SHOT USING KNOWN POINTS

VIDEO APPARATUS AND METHOD FOR IDENTIFYING AND COMMISSIONING DEVICES

CROSS-REFERENCE TO RELATED APPLICATIONS

This application claims the benefit of the following U.S. Provisional Applications, each of which is herein incorporated by reference for all intents and purposes.

| SERIAL NUMBER | FILING DATE | TITLE |
| --- | --- | --- |
| 61/673,315 (FBQ.1005) | Jul. 19, 2012 | VIDEO APPARATUS AND METHOD FOR IDENTIFYING AND COMMISSIONING DEVICES |
| 61/811,562 (FBQ.1007) | Apr. 12, 2013 | CONCURRENT COMMISSIONING AND GEOLOCATION SYSTEM |

This application is related to the following co-pending U.S. Patent Applications, each of which has a common assignee and common inventors.

| SERIAL NUMBER | FILING DATE | TITLE |
| --- | --- | --- |
| (FBQ.1007) | Jul. 19, 2013 | CONCURRENT COMMISSIONING AND GEOLOCATION SYSTEM |

BACKGROUND OF THE INVENTION

1. Field of the Invention

This invention relates in general to the field of building automation, and more particularly to apparatus and methods for identifying, locating, and commissioning devices into a building management system.

2. Description of the Related Art

The problem with resources such as electrical power is that its generation and consumption vary with respect to time. It is limited in supply and the demand for this limited supply is constantly fluctuating. As anyone who has participated in a rolling blackout will concur, the times are more and more frequent when consumers are forced to face the realities of limited supply.

Not only is the supply of electrical power limited, but generation of it to meet demand is quite costly, both in terms of peak demand generators and also in terms of the environmental impact resulting therefrom. There is pressure from within and without the community for more coordinated control of electrical power generations, and in particular for overall reduction of consumption by consumers.

Not surprisingly, the electrical power generation and distribution community has begun to take proactive measures to protect limited supplies of electrical power by imposing a surcharges on consumers for consumption above specified amounts and also for peak consumption. Heretofore, consumers merely paid for the total amount of power that they consumed over a billing period. Today most energy suppliers are not only charging customers for the total amount of electricity they have consumed over the billing period, but they are additionally charging them for exceeding a peak total amount, and for exceeding a peak demand amount.

In addition to surcharges for excess use, utility companies and their agents are also offering incentives to consumers for reductions in overall and peak consumption. Often, these incentives take the form of subsidies to offset the expense of retrofitting existing systems within a facility with more intelligent and power efficient systems. Consider, for example, retrofitting a system of fluorescent light fixtures with more efficient and more intelligent light fixtures. The intelligent fixtures require replacement, but may also require commissioning onto a network that allows for control of the fixtures by a building management system. In basic terms, the management system will determine when it is allowable to reduce the overall power consumption of a corresponding facility by either dimming certain lights or by turning them off altogether.

But the labor involved to commission these more intelligent fixtures, as one skilled in the art will appreciate, is substantial. In many cases building plans do not exist which can accurately locate the fixtures. Replacement of the fixtures is quite labor intensive, and the addition of network commissioning requirements exponentially increases the labor required and the probability for error.

As one skilled in the art will appreciate, present day devices typically are commissioned onto a wired or wireless network in a serial fashion. The preceding paragraphs have specifically exemplified light fixtures within a facility, but the problem of device commissioning extends beyond light fixtures to virtually any type of electrical devices (e.g., routers, cameras, alarms, motion sensors, actuators, etc.) that are required to be commissioned onto a wired or wireless network. Accordingly, a technician will determine the identification number (e.g., MAC ID, serial number, etc.) for a first device, place a first device in a commissioning mode, perform the necessary procedures to commission the device onto the network, and then move on to a second device where the process is repeated, ad nauseum, until a final device is commissioned.

The present inventors have observed the above noted probabilities for both error and exceeding cost, and have determined that they are both limiting and problematic.

Therefore, what is needed is a mechanism that enables multiple devices to be identified and commissioned onto a network.

In addition, what is needed are apparatus and methods that provide for simultaneous identification and commissioning of light-emitting devices onto a network.

What is further needed is a technique for simultaneously identifying, locating, and commissioning a plurality of devices emitting ultraviolet, visible light, and/or infrared waves onto a network.

SUMMARY OF THE INVENTION

The present invention, among other applications, is directed to solving the above-noted problems and addresses other problems, disadvantages, and limitations of the prior art. The present invention provides a superior technique for concurrently identifying, locating, and commissioning a plurality of devices. In one embodiment, an apparatus for concurrently identifying and commissioning a plurality of devices is provided. The apparatus includes a video recording device and a gateway device. The video recording device is configured to record and process a plurality of video images of the plurality of devices, and is configured to determine identification information and a geolocation corresponding to each of the plurality of devices, where the geolocation is determined by combining known coordinates and dimensions of an object within the plurality of video images, and a location of the each of the plurality of devices relative the video recording device, and where the plurality of video images comprises unique encoded luminous transmissions simultaneously transmitted from the each of the plurality of devices. The gateway device is coupled to the video recording device and the plurality of devices, and is configured to receive the identification information, and is configured to commission the each of the plurality of devices onto a network.

One aspect of the present invention contemplates an apparatus for concurrent identification and commissioning. The apparatus has a video recording device and a gateway. The video recording device is configured to record and process a plurality of video images of a plurality of light fixtures, and is configured to determine identification information and a geolocation corresponding to each of the plurality of light fixtures, where the geolocation is determined by combining known coordinates and dimensions of an object within the plurality of video images, and a location of the each of the plurality of light fixtures relative the video recording device, and where the plurality of video images comprises unique encoded luminous transmissions simultaneously transmitted from the each of the plurality of light fixtures. The gateway device is coupled to the video recording device and the plurality of light fixtures, and is configured to receive the identification information, and is configured to commission the each of the plurality of light fixtures onto a network.

Another aspect of the present invention comprehends a method for concurrently identifying and commissioning a plurality of devices. The method includes recording and processing a plurality of video images of the plurality of devices to determine identification information and a geolocation corresponding to each of the plurality of devices, where the geolocation is determined by combining known coordinates and dimensions of an object within the plurality of video images, and a location of the each of the plurality of devices relative the video recording device, and where the plurality of video images comprises unique encoded luminous transmissions simultaneously transmitted from the each of the plurality of devices; and via a gateway device, receiving the identification information, and commissioning the each of the plurality of devices onto a network.

BRIEF DESCRIPTION OF THE DRAWINGS

These and other objects, features, and advantages of the present invention will become better understood with regard to the following description, and accompanying drawings where.

DETAILED DESCRIPTION

Exemplary and illustrative embodiments of the invention are described below. In the interest of clarity, not all features of an actual implementation are described in this specification, for those skilled in the art will appreciate that in the development of any such actual embodiment, numerous implementation specific decisions are made to achieve specific goals, such as compliance with system-related and business related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase.

Figure 1:
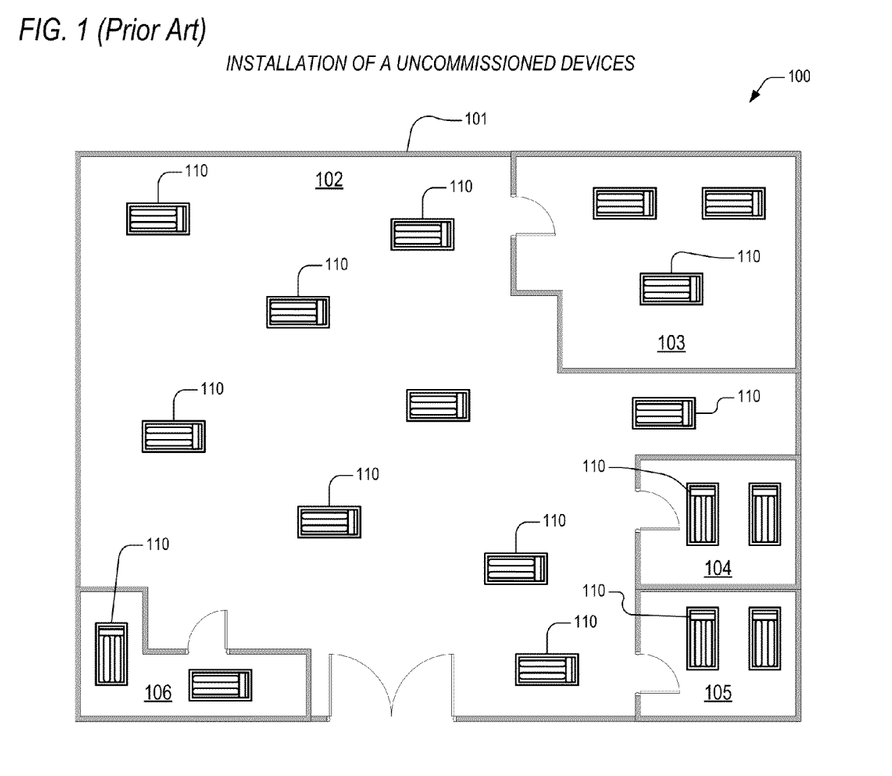
FIG. 1 is a block diagram illustrating a present day installation of uncommissioned devices within a building or facility.

In view of the above background discussion device commissioning and associated techniques employed within present day buildings and facilities for the identification and commissioning of multiple devices, a discussion of the limitations and disadvantages of present day mechanisms will now be presented with reference to FIG. 1. Following this, a discussion of the present invention will be presented with reference to FIGS. 2-11. The present invention overcomes the limitations and disadvantages of present day identification and commissioning mechanisms by providing apparatus and methods for concurrent identification, locating, and commissioning of a multiple devices that utilize video processing and recognition techniques to discriminate individual devices from within a plurality of devices that are each transmitting encoded information over an optical channel.

Referring to FIG. 1, a block diagram 100 is presented illustrating a present day installation of uncommissioned devices 110 within a building 101 or facility 101. The facility 101 may include a large, open area 102, rectangular office spaces 104-105 of substantially the same size. The building 101 may also include a number of non-rectangular spaces 103, 106. A plurality of devices 110 may be disposed in any of the spaces 102-106 in a pattern that may not necessarily be uniform or consistent. These devices 110 may comprise fluorescent fixtures of differing sizes and intensities. The devices 110 may additionally comprise incandescent fixtures of differing sizes and intensities. The devices 110 may also comprise light-emitting diode (LED) lighting fixtures of differing sizes and intensities. The devices 110 may further comprise infrared (IR) fixtures of differing sizes and intensities. The devices 110 may moreover comprise ultra-violet (UV) fixtures of differing sizes and intensities. The devices 110 may additionally comprise a combination of fluorescent, incandescent, LED, IR, or UV fixtures of differing sizes and intensities. What is common to these devices 110 is that they may emit electromagnetic transmissions in the visible, UV, or infrared spectrums. The devices 110 may also comprise high intensity discharge (HID) fixtures. The devices 110 may moreover comprise sensors such as, but not limited to, occupancy sensors and daylight harvesters. The devices 110 may furthermore comprise controls such as, but not limited to, switches and actuators.

The devices 110 may include elements therein that require commissioning into a system of devices 110. As is understood herein, the act of commissioning a device 110 comprises identifying and configuring the device and its corresponding system of devices 110 as a whole so that the device 110 functions properly in its intended environment. The devices 110 within the facility 101 of FIG. 1 may also include a controller (e.g., a ballast) (not shown) that may comprise a wireless radio (not shown) that requires commissioning onto a corresponding low-power wireless mesh network such as those prescribed in standards including IEEE 802.15.4 and ZigBee, or Wi-Fi networks such as a wireless local area network (WLAN) according to IEEE 802.11 standards. Other types of networks are contemplated as well. As one skilled in the art will appreciate, in a network of wireless devices 110, the commissioning process additionally comprises enabling one or more of the wireless devices 110 to function properly over a corresponding wireless network (not shown). The devices 110 may further comprise additional sensors and/or controls that may be utilized by a building management system or other systems for purposes of energy or environmental management.

As one skilled will also appreciate, present day techniques for identifying and commissioning typically require unknown devices 110 to be identified and commissioned serially, that is, one at a time. Once a particular device 110 is located, its identification information (e.g., network identifier (ID), media access control (MAC) ID, extended unique identifier (EUI) ID is recorded. Then a next device 110 is located and identified. And so on, until a last device is located and identified.

A device's identification and location can be obtained several ways. For example, in the simplest fashion, a technician (not shown) may read a label (not shown) on the device 110 that shows an identifying number for the device 110. This identifying number may be, for instance, a MAC address number, a Zigbee IEEE number, or a mere serial number. Once the number is located, it is recorded either on paper or in a computerized database along with physical location of the device 110. The location of the device 110 may be precise if an accurate facility floor plan exists and measurement equipment is employed by the technician to determine the precise location of the device. Alternatively the location of the device may be imprecise if a floor plan does not exist or if measurement equipment is not employed.

In a slightly more complex manner, a device 110 may have a label attached thereto that includes a bar code depicting the device's identifying number. Once the device 110 is located, a bar code reader or scanner is employed to record the identifying number, making the labor involved to commission the plurality of devices 110 much less prone to error.

A more complex technique provides for devices 110 having a communications port, through which an identifying number is obtained over a wired or wireless link between the device 110 and identification equipment (not shown). This identification equipment may comprise a gateway or commissioning coordinator that queries and identifies each of the plurality of devices 110 in a serial fashion. That is, the plurality of devices 110 is powered up—one at a time—and the gateway/coordinator identifies each device 110 as it is powered up along with its location, if available, where the location is determined according to the methods described above.

Another mechanism currently employed to identify devices 110 requires that the devices 110 have an external sensor (e.g., an infrared sensor) that is activated by an external source (e.g., a technician shining an infrared light onto the sensor to initiate the identification process). Other devices 110 may have an actuator (e.g., a pushbutton) that the technician actuates to begin the identification process. Once activated, a given device 110 may begin to transmit a rudimentary optical or audible code that conveys the device's MAC ID, for example, along with an indication that it is in a commissioning mode (e.g., "my commissioning button was just pushed"), whereby the given device 110 is identified and recorded by a commissioning device (not shown) that is programmed to receive suitably encoded transmissions.

Once a device's identification is known by the commissioning device, the device 110 is then commissioned on to the network of devices 110 via mechanisms that are well known in the art.

In all the above cases, the identifier (e.g., technician, bar code reader, gateway, commissioning device) must record both a device's identifying number and its location. In rare cases, a device's location may not be required, and thus the commissioning process may appear relatively simple. Yet, regardless of whether location is required or not, present day techniques for identifying, locating, and commissioning devices 110 on to a network require that the devices 110 be processed serially, that is, one at a time. And more often than not, accurate floor plans are not available to precisely geolocate the devices 110.

Thus, in order to process a plurality of devices 110, each of the plurality of devices 110 must be processed in a serial manner, that is, one device after another. Consequently, more time and labor are required to identify, locate, and commission a network that includes the plurality of devices 110, which one skilled in the art will appreciate is quite costly from a network administration perspective. If a particular identifying/locating/commissioning process requires human intervention (to, say, read a label, scan a bar code, shine a light, or push a button), then the probability of human error is increased along with the labor cost to remedy errors that are thereby induced. In addition, even with accurate floor plans, geolocation of devices is a very labor-intensive process. In the absence of accurate floor plans, geolocation results are so imprecise that they are virtually useless.

The present inventors have observed that the labor-intensive and serial nature of device commissioning within a facility is limiting and disadvantageous due to the high probability of error due to technician mistakes and resulting from the amount of labor that is required to serially identify, locate, and commission each of the devices 110 in the network.

The present invention overcomes the above noted limitations and disadvantages, and others, by employing one or more video recording devices that may be physically coupled to a geolocation device as an integral part of a commissioning process to provide concurrent commissioning and geolocation services. The one or more video recording devices provide the capability of simultaneously identifying and commissioning a plurality of devices, and the geolocation device provides a single and precise positional datum. The video recording device may comprise one or more algorithms that execute on a processor to provide for simultaneous identification, locating, and commissioning and to also minimize technician interaction in the identification, locating, and commissioning process. The geolocation device may comprise multiple mechanisms, each independently capable of generating geolocation information. The present invention will now be discussed with reference to FIGS. 2-11.

Figure 2:
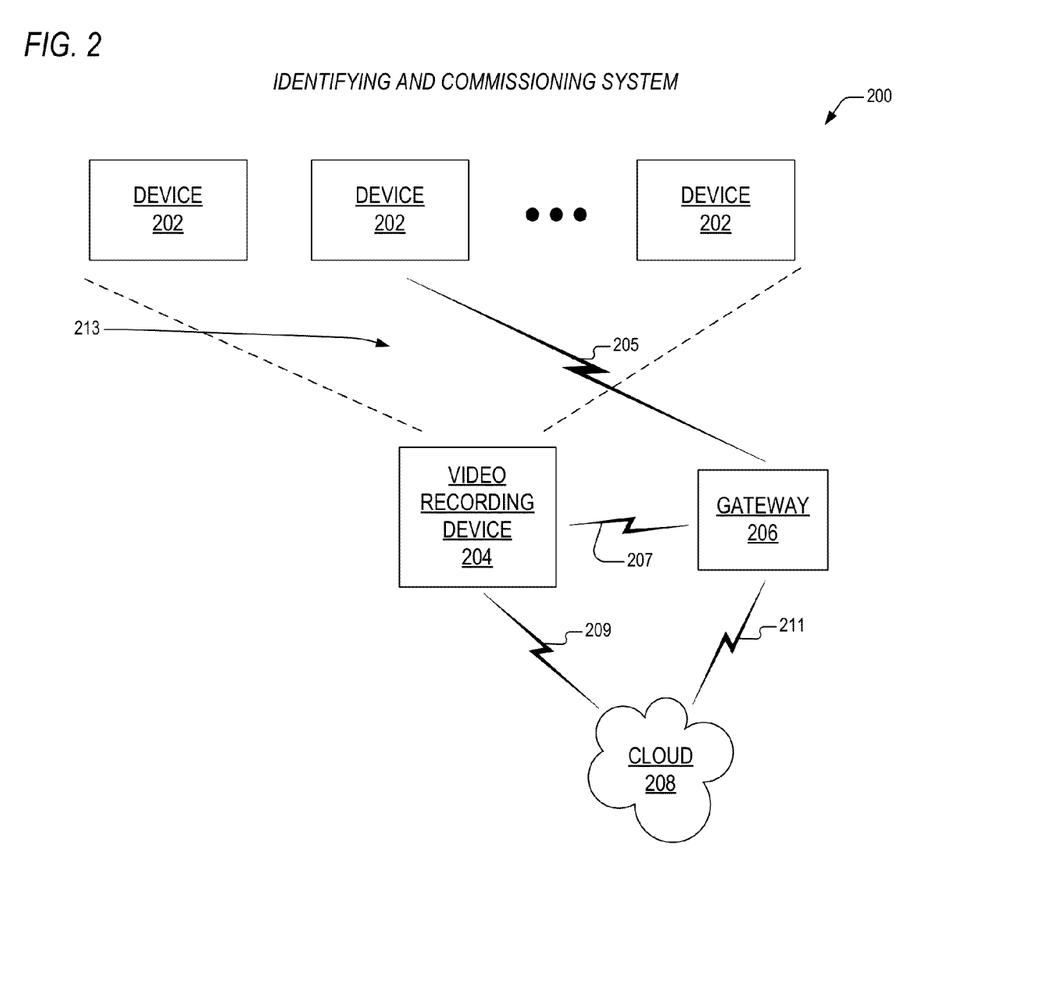
FIG. 2 is a block diagram depicting an identifying and commissioning system according to the present invention.

Now referring to FIG. 2, a block diagram 200 is presented depicting an identifying and commissioning system according to the present invention. The diagram 200 shows a plurality of devices 202, substantially similar to those devices 110 described with reference to FIG. 1, that require identification and commissioning on to a network, including any of the network types discussed above. Each of the devices 202 is capable of changing illumination (i.e., luminous intensity) at their specific wavelengths through modulation such as on-off, amplitude, frequency, etc., varying gradations of lux magnitude, or by providing constant illumination along with capabilities for movement. As uncommissioned devices 202, their unique identifying numbers (e.g., MAC address number) and/or physical locations are unknown to the system. The devices 202 are coupled to a gateway device 206 via a wired or wireless link 205 (e.g., Ethernet, Wi-Fi, Bluetooth, ZigBee, and etc.) that provides for one form of communication with the devices 202. In one embodiment the gateway device 206 couples a local area network comprising links 207 and 205 to a wide area network (WAN) such as, but not limited to, the Internet. In another embodiment, the gateway device 206 comprises a digital subscriber line (DSL) modem. In a further embodiment, the gateway device 206 comprises a cable modem. In yet another embodiment, the gateway device 206 comprises a wireless router. Other embodiments are contemplated as well.

One or more video recording devices 204 having an optical field of view 213 are coupled to the gateway device 206 via a wired or wireless link 207. Henceforth, for clarity, only one video recording device 204 will be discussed, but the present inventors note that the features described herein may be disposed in a plurality of video recording devices 204 to accomplish substantially the same functions. In one embodiment, link 207 utilizes common hardware and software as link 205. The recording device 204 may be capable of executing one or more application programs comprising algorithms disposed in a memory (not shown) via a central processing unit (CPU) (or, "processor") (not shown), and which are directed towards identification and commissioning of the devices 202 and minimizing technician interaction. The application programs may include algorithms configured to discriminate luminous intensities at wavelengths commensurate with those of the devices 202, where the luminous intensities correspond to particular areas in the field of view 213, so as to distinguish luminous transmissions between each of the devices 202. The application programs may further be configured to distinguish luminous modulation via device movement in the particular areas. The application programs may further be configured to distinguish frequencies of luminous modulations in the particular areas. The particular areas within the field of view 213 are configured in terms of pixel size to be compatible with the size of the devices 202 so as to support discrimination of luminous transmissions between each of the devices 202. The CPU and memory may be disposed within the video recording device 204, or they may be disposed in a processing unit (not shown) that is coupled to the video recording device 204. The video recording device 204 may be coupled to cloud storage 208 via a conventional wired or wireless link 209. The gateway 206 is also coupled to the cloud storage 208 via a conventional wired or wireless link 211.

In operation, the video recording device 204 records video images of the unidentified and uncommissioned devices 202 while the devices 202 simultaneously function in a commissioning mode. In this mode each of the devices 202 transmits a device-specific luminous intensity pattern, either via a coded transmission or by constant illumination and coded movement (thus resulting in a coded transmission), where transmissions from all of the devices 202 occur simultaneously. In one embodiment, the coded transmission comprises a device-specific luminous intensity amplitude modulation (including on-off keying) that enables simultaneous (e.g., parallel) identification and commissioning of devices 202 according to the present invention. In one embodiment, each of the devices 202 may transmit a unique transmission configured to inform the video recording device 204 that it is in the commissioning mode along with its unique identifier. In one embodiment, to place the devices 202 in the commissioning mode, a commissioning command may be broadcast over link 205 by the gateway 206. That is, rather than requiring each device 202 to be identified and commissioned on to the network serially, the devices 202 are simultaneously activated by the gateway 206 and are identified and commissioned on to the network while the devices 202 are simultaneously exhibiting their device-specific light patterns.

Accordingly, the images recorded by the video recording device 204 are then processed by the one or more application programs to identify and locate each of the devices 202 relative to one another so that a display (not shown) may be presented to a technician (not shown) showing relative locations of the identified devices 202 along with their unique identification numbers. In one embodiment, once the devices 202 are identified and presented, conventional mechanisms are employed by video recording device 204 to direct the gateway 206 over link 207 to commission each of the identified devices 202 on to the network by known means over link 205. Results of the video processing that include identification and relative location of the devices may be transmitted to the cloud storage 208 directly via link 209, or indirectly through the gateway 206 via links 207 and 211.

In another embodiment, the recording device 204, the gateway 206, and the plurality of devices 202 are synchronized in time such that the device-specific light pattern for a given device 202 may consist of flashing a prescribed light pattern during a prescribed time slot. Time synchronization may be achieved through a network time protocol or by any technique which is well known in the art. Accordingly, the gateway 206 may broadcast a command to the devices 202 via link 205 that directs the devices 202 to begin coded transmissions, where each of the coded transmissions convey identifying data (e.g., MAC address) for a corresponding device 202. In one embodiment, the prescribed light pattern and time slot are mutually exclusive from other light patterns and time slots provided for remaining devices 202 in the network. Transmissions by the devices 202 are multiplexed in time, and each device 202 transmits a luminous intensity pattern (by either direct modulation or by movement) that is unique to that device 202. Another embodiment contemplates unique transmissions by each of the devices 202, which are not time multiplexed, that is, other multiple access coding schemes may be employed, such as frequency division multiplexing (FDM), orthogonal FDM (OFDM), or code division multiplexing (CDM). Algorithms executing on the video recording device 204 are configured to demultiplex the transmissions and identify the individual devices 202.

In one embodiment, the video recording device 204 comprises a smart cellular telephone including, but not limited to, an IPHONE®, an ANDROID® phone, a WINDOWS® phone, and the like. Another embodiment contemplates the video recording device 204 as a tablet computer such as, but not limited to, an IPAD® or WINDOWS® tablet computer. A further embodiment utilizes a video recording system having processing capabilities disposed therein or coupled thereto. Yet another embodiment of the video recording device 204 comprises an external or independent video camera coupled to a processing device such as, but not limited to, a Universal Serial Bus (USB) web camera coupled to a laptop computer. An additional embodiment of the video recording device 204 considers a Wi-Fi enabled camera that is operationally coupled to a processor that is either on-site or off-site.

In one embodiment, the video recording device 204 communicates these transmissions to the gateway 206 and the gateway 206 provides processing capabilities for execution of the one or more application programs to allow for demultiplexing and identification and commissioning of the devices 202. The video recording device 204 either transmits the transmissions to the gateway 206 directly via link 207, or indirectly through cloud storage 208 via uplink 209 and downlink 211.

One embodiment of the present invention contemplates a recording device 204 having a Global Positioning Receiver (GPS) receiver disposed therein (such as an IPHONE® or IPAD®) and available for use by the one or more application programs. Accordingly, in operation, instead of relative location of each of the devices, an estimated physical location of each of the devices 102 is determined by execution of the one or more application programs using positional information provided by the GPS receiver. The recording device 204 thus utilizes its location as determined by the GPS receiver therein, and then estimates range within its field of view 213 to a given device 202, and thus assigns an estimated location to the given device 202.

Advantageously, the use of a video recording device 204 having a field of view 213 wherein specific light sources may be associated with particular areas in the field of view 213 allows for simultaneous (i.e., concurrent) transmission of identifying information by the plurality of devices 202 and subsequent identification, commissioning, and (optionally) accurately locating of each of the plurality of devices 202 since the algorithms of the one or more application programs are configured to isolate and identify an individual device 202 within the field of view 213 of the recording device 204.

In one embodiment of the present invention discussed above with reference to FIG. 2, locations of the devices 202 are estimated based upon information provided by the video recording device 204 having an internal GPS receiver. However, in the event that an accurate floor plan is unavailable or if previous attempts at identification and commissioning have resulted in imprecise locations, there arises a need for a commissioning system that provides more precise locations of devices. Accordingly, a concurrent identifying, locating, and commissioning system according to the present invention will now be discussed with reference to FIG. 3.

Figure 3:
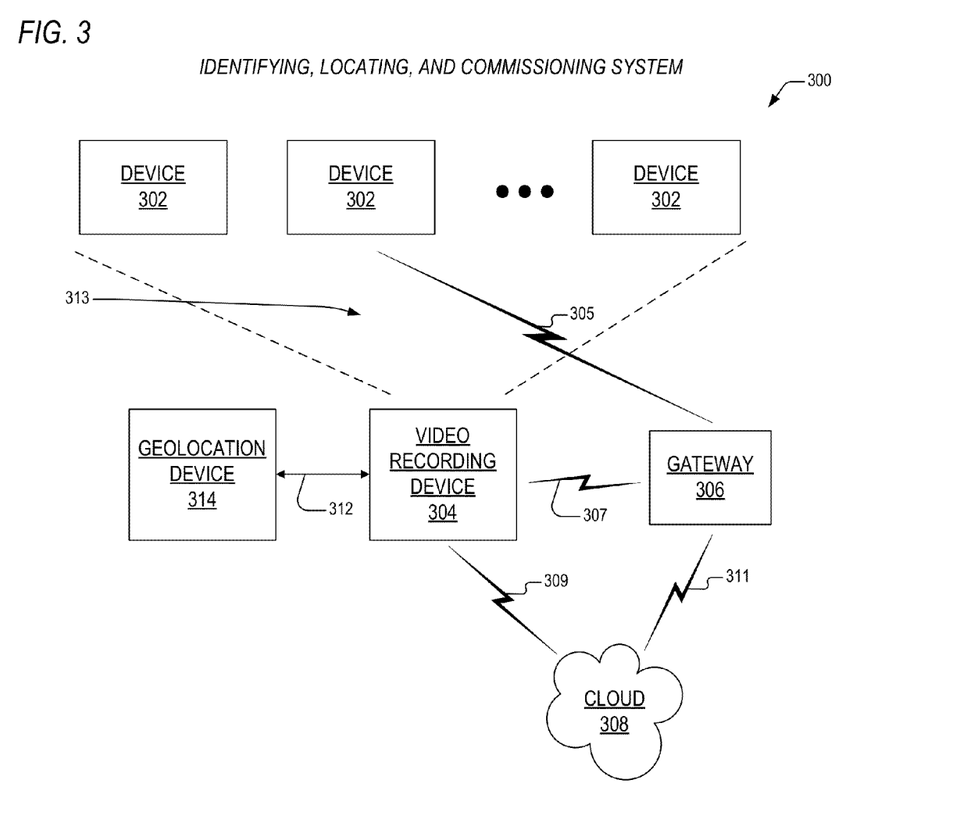
FIG. 3 is a block diagram featuring an identifying, locating, and commissioning system according to the present invention.

Turning to FIG. 3, a block diagram 300 is presented featuring an identifying, locating, and commissioning system according to the present invention. The diagram 300 shows a plurality of devices 302, substantially similar to those devices 110 described with reference to FIG. 1, that require identification, locating, and commissioning on to a network, including any of the network types discussed above. Each of the devices 202 is capable of changing illumination (i.e., luminous intensity) at their specific wavelengths through modulation such as on-off, amplitude, frequency, etc., varying gradations of lux magnitude, or by providing constant illumination along with capabilities for movement. As uncommissioned devices 302, their unique identifying numbers (e.g., MAC address number) and physical locations are unknown to the system. The devices 302 are coupled to a gateway device 306 via a wired or wireless link 305 (e.g., Ethernet, Wi-Fi, Bluetooth, ZigBee, and etc.) that provides for one form of communication with the devices 302. In one embodiment the gateway device 306 couples a local area network comprising links 307 and 305 to a wide area network (WAN) such as, but not limited to, the Internet. In another embodiment, the gateway device 306 comprises a digital subscriber line (DSL) modem. In a further embodiment, the gateway device 306 comprises a cable modem. In yet another embodiment, the gateway device 306 comprises a wireless router. Other embodiments are contemplated as well.

One or more video recording devices 304 having an optical field of view 313 are coupled to the gateway device 306 via a wired or wireless link 307. Henceforth, for clarity, only one video recording device 304 will be discussed, but the present inventors note that the features described herein may be disposed in a plurality of video recording devices 304 to accomplish substantially the same functions. In one embodiment, link 307 utilizes common hardware and software as link 305. The recording device 304 may be capable of executing one or more application programs comprising algorithms disposed in a memory (not shown) via a central processing unit (CPU) (or, "processor") (not shown), and which are directed towards identification and commissioning of the devices 302 and minimizing technician interaction. The application programs may include algorithms configured to discriminate luminous intensities at wavelengths commensurate with those of the devices 302, where the luminous intensities correspond to particular areas in the field of view 313, so as to distinguish luminous transmissions between each of the devices 202. The application programs may further be configured to distinguish luminous modulation via device movement in the particular areas. The application programs may further be configured to distinguish frequencies of luminous modulations in the particular areas. The particular areas within the field of view 313 are configured in terms of pixel size to be compatible with the size of the devices 302 so as to support discrimination of luminous transmissions between each of the devices 302.

The application programs are also configured to receive precise geolocation information (e.g., GPS coordinates) and to assign those coordinates to each of the plurality of devices 302 based upon offset information. The CPU and memory may be disposed within the video recording device 304, or they may be disposed in a processing unit (not shown) that is coupled to the video recording device 304. The video recording device 304 may be coupled to cloud storage 308 via a conventional wired or wireless link 309. The gateway 306 is also coupled to the cloud storage 308 via a conventional wired or wireless link 311. The video recording device 304 is also coupled to a geolocation device 314 via a wired or wireless link 312, where the geolocation device 314 is configured to provide a single and precise positional datum. Although the link 312 between the recording device 304 and the geolocation device may be wired are wireless, the physical location of the geolocation device 314 relative to the physical location of the video recording device 304 is fixed and is employed by the video recording device 304 as an offset to determine the video recording device's precise location. In one embodiment, the geolocation device 314 may comprise multiple mechanisms, each independently capable of generating geolocation information, where each of the multiple mechanisms may be used alone or together to augment determination of positional information. In one embodiment, the geolocation device 314 comprises a GPS receiver, producing geolocation information. Another embodiment of the geolocation device 314 contemplates an inertial measurement unit (IMU). A further embodiment of the geolocation device 314 utilizes a laser imaging detection and ranging (LIDAR) unit as the geolocation device. If multiple Wi-Fi access points exist within range of the system, then yet another embodiment of the present invention contemplates the use of Wi-Fi triangulation for purposes of geolocation, where the triangulation steps are executed within the one or more application programs. In yet another embodiment, Wi-Fi triangulation may be used as a stand-alone geolocation mechanism or it may be employed to augment other geolocation mechanisms as described above.

In operation, the video recording device 304 records video images of the unidentified and uncommissioned devices 302 while the devices 302 simultaneously function in a commissioning mode. In this mode each of the devices 302 transmits a device-specific luminous intensity pattern, either via a coded transmission or by constant illumination and coded movement (thus resulting in a coded transmission), where transmissions from all of the devices 302 occur simultaneously. In one embodiment, the coded transmission comprises a device-specific luminous intensity amplitude modulation that enables simultaneous identification and commissioning of devices 302 according to the present invention. In one embodiment, each of the devices 302 may transmit a unique transmission configured to inform the video recording device 304 that it is in the commissioning mode along with its unique identifier. In one embodiment, to place the devices 302 in the commissioning mode, a commissioning command may be broadcast over link 305 by the gateway 306. That is, rather than requiring each device 302 to be identified and commissioned on to the network serially, the devices 302 are simultaneously activated by the gateway 306 and are identified and commissioned on to the network while the devices 302 are simultaneously exhibiting their device-specific light patterns.

Concurrently, the geolocation device 314 generates an accurate position and the video recording device 304 employs this position to determine its accurate position.

Accordingly, the images recorded by the video recording device 304 and the geolocation information provided by the geolocation device 314 are then processed by the one or more application programs to identify and precisely locate each of the devices 302 so that a display (not shown) may be presented to a technician (not shown) showing precise coordinates of the identified devices 302 along with their unique identification numbers. In one embodiment, once the devices 302 are identified, located, and presented, conventional mechanisms are employed by video recording device 304 to direct the gateway 306 over link 307 to commission each of the identified devices 302 on to the network by known means over link 305. Results of the video processing that include identification and precise location of the devices may be transmitted to the cloud storage 308 directly via link 309, or indirectly through the gateway 306 via links 307 and 311. The video recording device 304 may also employ range imaging technology such as, but not limited to, a MICROSOFT® KINECT® motion sensing input or stereo pair techniques, so that the light patterns in the field of view 313 can be accurately located relative to the known location of the video device 304 executing the one or more application programs that are configured to employ video intrinsic parameters and computer vision algorithms to determine the precise locations of the devices 302.

In one embodiment, a building/floor plan will have one or more known data points that may include unique features of the building/floor (e.g., corners of the building, window locations, etc.), or that include the location of individual Wi-Fi access points. Each known data point will have known GPS coordinates that may be generated prior to the commissioning process or pre-known from other sources, (e.g., Google maps, etc.).

Accordingly, the geolocation device 314 will begin with a known data point having corresponding GPS coordinates. As the video device 304 and geolocation device 314 move within the floor/building, the geolocation device 314 may combine the absolute GPS coordinates of data point(s) of a floor plan with other positional information using the offset position of the video device 304 relative to the position of the geolocation device 314. The other positional information may be generated from an IMU, a LIDAR, and/or Wi-Fi triangulation, and/or a combination thereof. The video device 304, while recording within its field of view 313, will also know its absolute GPS coordinates based upon the GPS coordinates of the geolocation device 314 and a fixed offset of the relative positions of the devices 304, 314. Once the devices 302 within the field of view 313 are identified, the video device 304 may employ range imaging technology as described above so that the light patterns in the field of view 313 are accurately located relative to the location of the video device 304, which is physically coupled to the geolocation device 314, using the video intrinsic parameters and computer vision algorithms. The relative positional information is combined with the absolute positional information generated from the geolocation device 314 to produce GPS absolute coordinates for each individual device 302 within the field of view 313.

In another embodiment, the recording device 304, the gateway 306, and the plurality of devices 302 are synchronized in time such that the device-specific light pattern for a given device 302 may consist of flashing a prescribed light pattern during a prescribed time slot. Time synchronization may be achieved through a network time protocol or by any technique which is well known in the art. Accordingly, the gateway 306 may broadcast a command to the devices 302 via link 305 that directs the devices 302 to begin coded transmissions, where each of the coded transmissions convey identifying data for a corresponding device 302. In one embodiment, the prescribed light pattern and time slot are mutually exclusive from other light patterns and time slots provided for remaining devices 302 in the network. Transmissions by the devices 302 are multiplexed in time, and each device 302 transmits a luminous intensity pattern (by either direct modulation or by movement) that is unique to that device 302. Another embodiment contemplates unique transmissions by each of the devices 302, which are not time multiplexed, that is, other multiple access coding schemes may be employed, such as frequency division multiplexing (FDM), orthogonal FDM (OFDM), or code division multiplexing (CDM). Algorithms executing on the video recording device 302 are configured to demultiplex the transmissions and identify the individual devices 302.

In one embodiment, the video recording device 304 comprises a smart cellular telephone including, but not limited to, an IPHONE®, an ANDROID® phone, a WINDOWS® phone, and the like. Another embodiment contemplates the video recording device 304 as a tablet computer such as, but not limited to, an IPAD® or WINDOWS® tablet computer. A further embodiment utilizes a video recording system having processing capabilities disposed therein or coupled thereto. Yet another embodiment of the video recording device 304 comprises an external or independent video camera coupled to a processing device such as, but not limited to, a Universal Serial Bus (USB) web camera coupled to a laptop computer. An additional embodiment of the video recording device 304 considers a Wi-Fi enabled camera that is operationally coupled to a processor that is either on-site or off-site.

In one embodiment, the video recording device 304 communicates these transmissions and coordinates to the gateway 306 and the gateway 306 provides processing capabilities for execution of the one or more application programs to allow for demultiplexing, identification, locating, and commissioning of the devices 302. The video recording device 304 either transmits the transmissions to the gateway 306 directly via link 307, or indirectly through cloud storage 308 via uplink 309 and downlink 311.

Advantageously, the use of a video recording device 304 having a field of view 313 wherein specific light sources may be associated with particular areas in the field of view 313 allows for simultaneous (i.e., concurrent) transmission of identifying information by the plurality of devices 302. Subsequently, each of the devices 302 is identified, located, and commissioned by utilizing concurrently generated positional data provided by the geolocation device 314 since the algorithms of the one or more application programs are configured to isolate and identify an individual device 302 within the field of view 313 of the recording device 204, and to employ locating mechanisms to provide relative offsets for each of the devices 302 from the precise known position of the video recording device 304.

In yet another embodiment of the present invention geolocation information (e.g., GPS coordinates) at the perimeter of the structure and/or known data points is employed by the system and positional data for points within the structure where a GPS signal cannot be obtained is determined by the one or more application programs through interpolation or other known mechanisms. Accordingly, relative positional information for each of the devices 302 is generated based on absolute positions of the known points having known GPS coordinates. In one embodiment, the one or more application programs may utilize well known lengths of standard fixtures (e.g., fluorescent lights are known to be 2 feet by 2 feet or 2 feet by four feet dimensionally; standard ceiling tiles are known to be 2 feet by 2 feet dimensionally, and etc.) that are being recorded to determine the absolute locations of each of the devices 302 relative to the known data points. That is, the one or more application programs may employ a known length of a standard fixture within the field of view 313 to determine the relative spacing between devices 302 and total dimensions within the field of view 313. If the field of view 313 encompasses an entire room, then the entire dimensions of the room can be generated along with positions of the devices 302.

Another embodiment of the present invention contemplates a recording device 304 that includes an orientation mechanism (e.g., a compass) (not shown). Accordingly, orientation and relative positional information resulting from the identification, locating, and commissioning process according to the present invention can be overlaid within floor plans of the building, or they may be employed to create a new floor plan. Recorded images and results will thus include a known orientation that can be used in conjunction with a floor plan orientation to achieve a proper orientation when overlayed.

Figure 4:
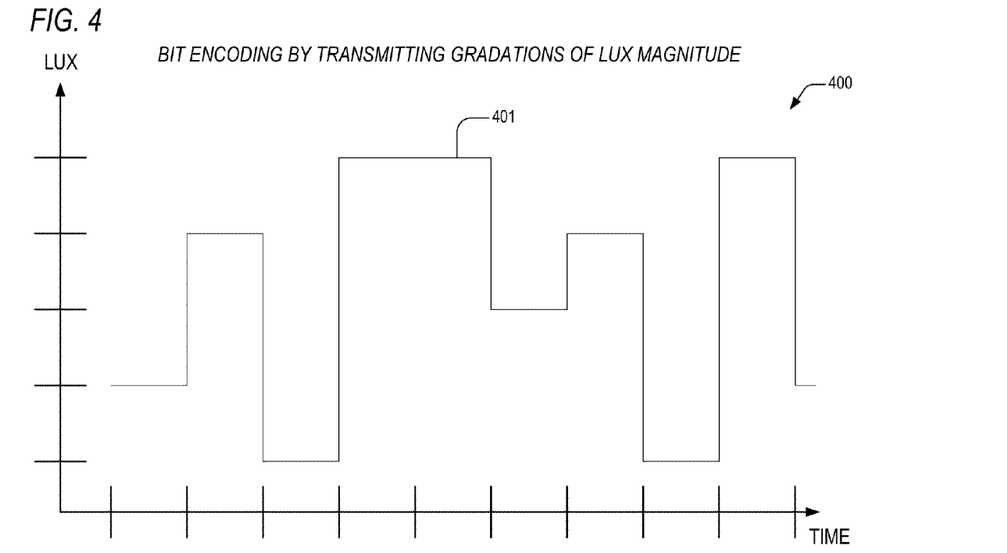
FIG. 4 is a timing diagram showing an example of how identification information is encoded according to the present invention by transmitting gradations of lux magnitude.

Turning now to FIG. 4, a timing diagram 400 is presented showing an example of how identification information is encoded according to the present invention by transmitting gradations of lux magnitude. The diagram 401 depicts an optical signal 401 that is transmitted by one of a plurality of devices according to the present invention, such as one of the devices 202, 302 discussed above with reference to FIGS. 2-3. Accordingly, when the device 202, 302 is placed in a commissioning mode, it may begin to transmit a repeating sequence of bits that are represented by different gradations of lux magnitude, which indicate the device's unique identifying number. In this embodiment, a coded transmission may consist of modulating luminous emittance (i.e., lux magnitude) according to the coding scheme (e.g., TDM, FDM, CDM, etc.) that is employed by the network. In one embodiment, gradations of lux magnitude (e.g., 100%, 90%, 80%, etc.) may be employed for information bit encoding, such as may be achievable in an electronically dimmable ballast or driver. Accordingly, the one or more application programs executed to process video images are configured to demultiplex and decode the transmitted bit patterns 401.

In a time division multiplexed embodiment, the encoded bit pattern 401 for a given device 202, 302 is employed to communicate device identification in an assigned time slot. In an exemplary embodiment, time slots are assigned at 100 millisecond intervals to allow for detection by, say, a recording device 204, 304 which provides for a 30 frame/second recording rate. As one skilled in the art will appreciate, transmission times, frequencies, and etc. are more likely to be limited by transmission capabilities of the devices 202, 302 themselves as in, say, a dimmable ballast having finite thermal inertia and frequency response attributes.

Figure 5:
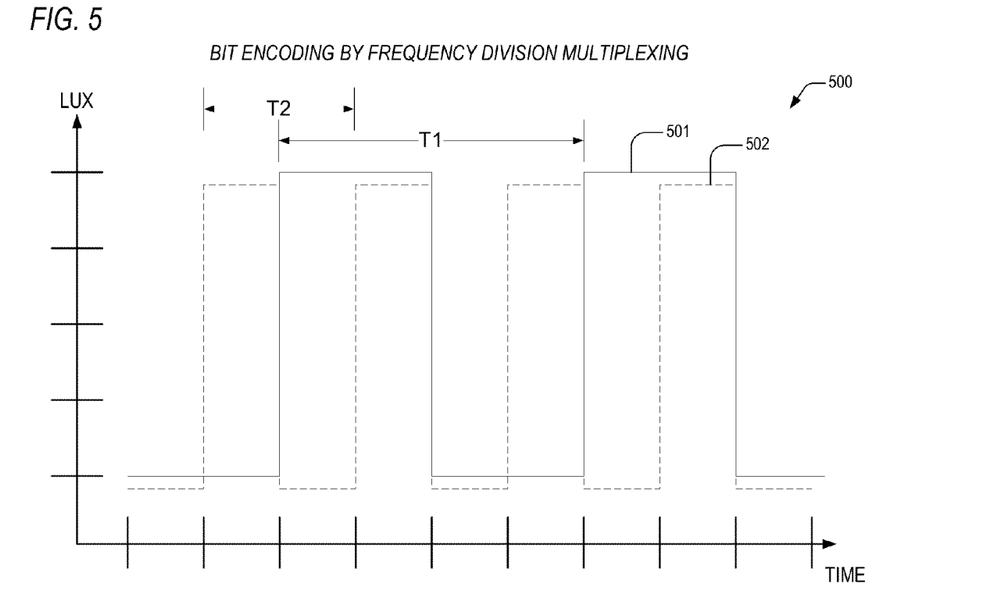
FIG. 5 is a timing diagram illustrating another example of how identification information is encoded according to the present invention by transmitting frequency division multiplexed gradations of lux magnitude.

Referring to FIG. 5, a timing diagram 400 is presented showing an example of how identification information is encoded according to the present invention by transmitting frequency division multiplexed gradations of lux magnitude. The diagram depicts a first optical signal 501 transmitted by a first device 202, 302, having a period of T1. The diagram 500 also depicts a second optical signal 502 transmitted by a second device 202, 302, having a period of T2. Thus, a frequency division multiplexed embodiment according to the present invention utilizes the one or more application programs to process video images such that multiple signals 501-502 corresponding to multiple devices 202, 302 are demultiplexed, and the individual signals 501-502 are decoded.

Figure 6:
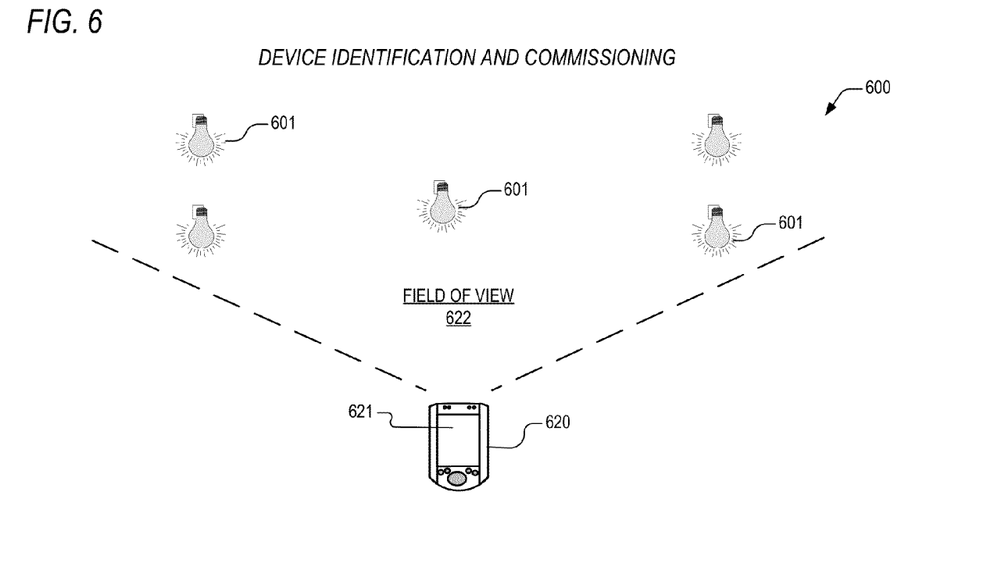
FIG. 6 is a block diagram detailing concurrent multiple device identification and commissioning according to the present invention.

Now referring to FIG. 6, a block diagram 600 is presented detailing concurrent multiple device identification and commissioning according to the present invention. The diagram 600 shows five devices 601, like the devices 202 discussed above with reference to FIG. 2, that are disposed within a building. The devices 601 are all within a field of view 622 of a recording device 620 according to the present invention, like the recording device 204 of FIG. 2. The recording device 620 includes a display 621. Other elements (e.g., gateway, cloud storage) of the embodiment of FIG. 2 are not depicted for clarity sake.

Operationally, the devices 601 are placed in a commissioning mode and begin to transmit their unique identification numbers via one of the techniques discussed above with reference to FIGS. 2 and 4-5. One or more application programs corresponding to the recording device 620 execute to process video images provided by the recording device 620 in order to demultiplex and decode concurrently transmitted optical signals from the devices 601 such that a unique identification number for each of the devices 601 is determined. The devices 601 are subsequently commissioned on to a network as described above. If the recording device 620 includes a GPS receiver (e.g., an IPAD® embodiment), then relative positional information may be determined as well by execution of the one or more application programs. The results of the identification (and relative locating, if available) are provided on the display 621.

Figure 7:
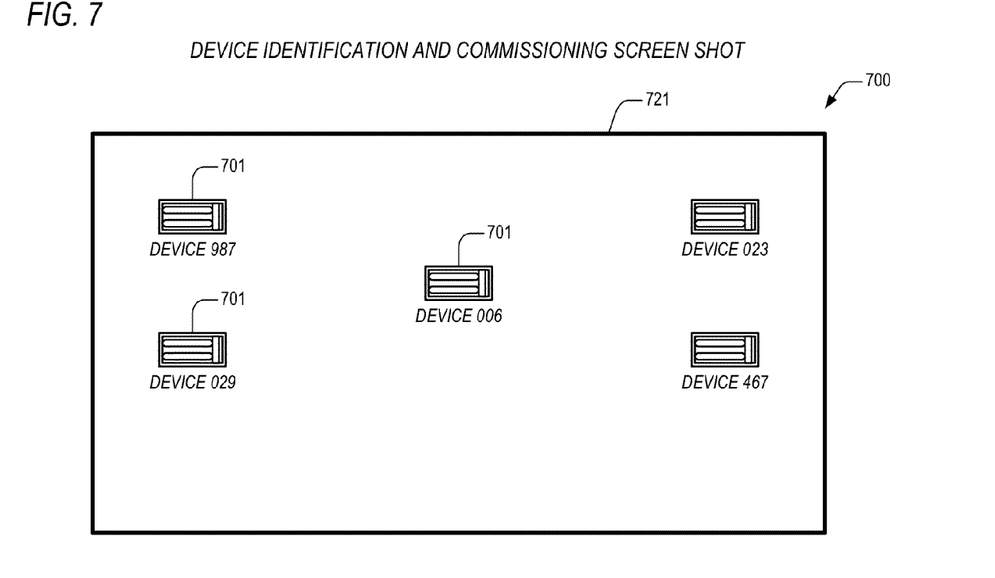
FIG. 7 is a block diagram a showing a screen shot from the display of the video recording device of FIG. 6.

Turning to FIG. 7, a block diagram 700 is presented a showing a screen shot 721 from the display 621 of the video recording device 620 of FIG. 6. The shot 721 shows five device icons 701 along with their unique identification numbers DEVICE 987, DEVICE 029, DEVICE 006, DEVICE 023, DEVICE 467 as have been determined by demultiplexing and decoding their simultaneously transmitted optical signals. The screen shot 721 also shows the icons 701 relatively positioned in the display 621 (in the case that the recording device 620 includes a GPS receiver).

Figure 8:
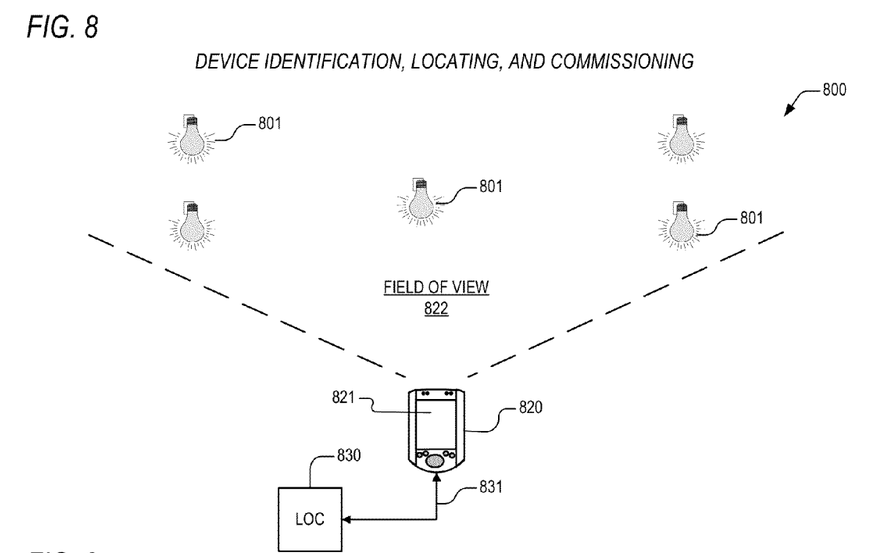
FIG. 8 is a block diagram detailing concurrent multiple device identification, locating, and commissioning according to the present invention.

Now turning to FIG. 8, a block diagram 800 is presented detailing concurrent multiple device identification, locating, and commissioning according to the present invention. The diagram 700 shows five devices 801, like the devices 302 discussed above with reference to FIG. 3, that are disposed within a building. The devices 801 are all within a field of view 822 of a recording device 820 according to the present invention, like the recording device 304 of FIG. 3. The recording device 820 includes a display 821. The recording device 820 is coupled via bus 831 to a geolocation device 830, like the geolocation device 314 of FIG. 3. Other elements (e.g., gateway, cloud storage) of the embodiment of FIG. 3 are not depicted for clarity sake.

Operationally, the devices 801 are placed in a commissioning mode and begin to transmit their unique identification numbers via one of the techniques discussed above with reference to FIGS. 3 and 4-5. One or more application programs corresponding to the recording device 820 execute to process video images provided by the recording device 820 in order to demultiplex and decode concurrently transmitted optical signals from the devices 801 such that a unique identification number for each of the devices 801 is determined. In parallel, the geolocation device 830 provides precise positional data so that the one or more application programs may determine accurate locations for each of the devices 801 according to the techniques discussed above. The devices 801 are subsequently commissioned on to a network as described above. The results of the identification and locating process are provided on the display 821.

Figure 9:
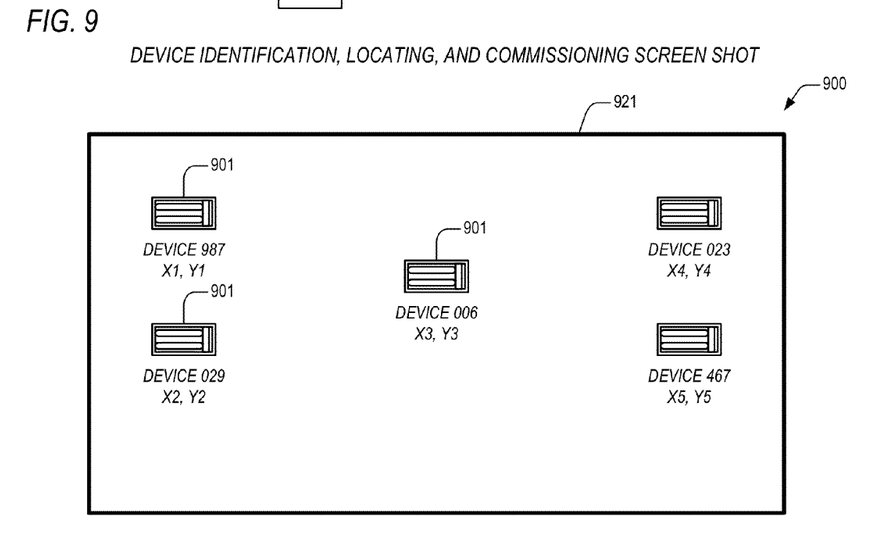
FIG. 9 is a block diagram illustrating a screen shot from the display of the video recording device of FIG. 8.

Referring to FIG. 9, a block diagram 900 is presented illustrating a screen shot 921 from the display 821 of the video recording device 820 of FIG. 8. The shot 921 shows five device icons 901 along with their unique identification numbers DEVICE 987, DEVICE 029, DEVICE 006, DEVICE 023, DEVICE 467 and corresponding precise coordinates X1,Y1-X5,Y5 as have been determined by demultiplexing and decoding their simultaneously transmitted optical signals. The coordinates X1,Y1-X5,Y5 may alternatively be expressed as longitudes and latitudes in accordance with conventional terms. Since precise locations are determined for each of the devices 801, the screen shot 921 shows the icons 901 relatively positioned in the display 821.

Figure 10:
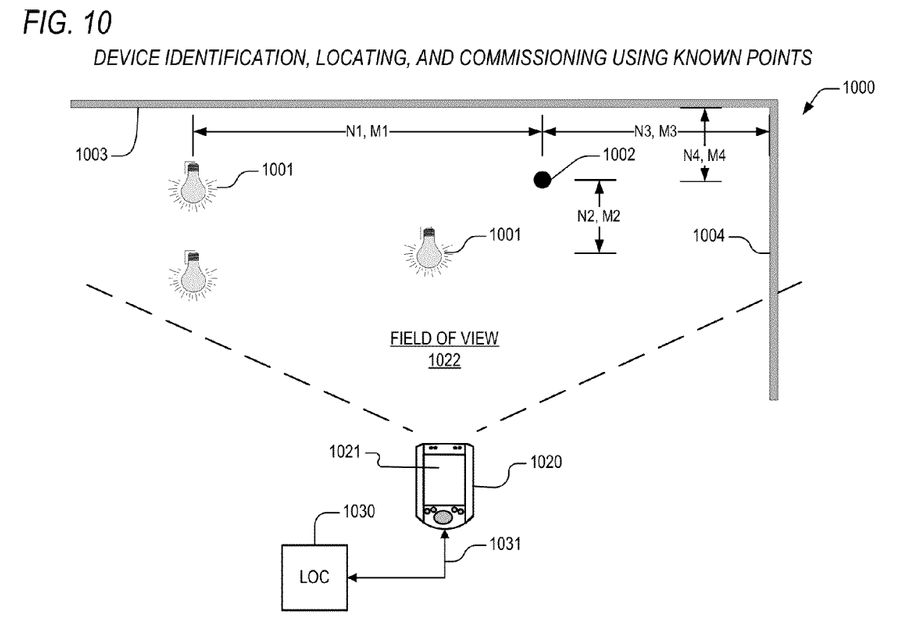
FIG. 10 is a block diagram depicting concurrent multiple device identification, locating, and commissioning according to the present invention by using known points.

Now referring to FIG. 10, a block diagram 1000 is presented depicting concurrent multiple device identification, locating, and commissioning according to the present invention by using known points. The diagram 700 shows three devices 1001, like the devices 302 discussed above with reference to FIG. 3, that are disposed within a building. The diagram also shows a first wall 1003 connected to a second wall 1004 forming a corner. The diagram further shows a known object 1002 whose precise coordinates are known. The devices 1001, the walls 1003-1004, and the objects are all within a field of view 1022 of a recording device 1020 according to the present invention, like the recording device 304 of FIG. 3. The recording device 1020 includes a display 1021. The recording device 1020 is coupled via bus 1031 to a geolocation device 1030, like the geolocation device 314 of FIG. 3. Other elements (e.g., gateway, cloud storage) of the embodiment of FIG. 3 are not depicted for clarity sake.

Operationally, the devices 1001 are placed in a commissioning mode and begin to transmit their unique identification numbers via one of the techniques discussed above with reference to FIGS. 3 and 4-5. One or more application programs corresponding to the recording device 820 execute to process video images provided by the recording device 820 in order to demultiplex and decode concurrently transmitted optical signals from the devices 801 such that a unique identification number for each of the devices 801 is determined. In parallel, since GPS signals are not available for use by the geolocation device 1030, the one or more application programs employ the coordinates and dimensions of the known object 1002 to determine accurate locations for each of the devices 1001 and the corner of the walls 1003-1004 according to the techniques discussed above by determining positional offsets N1,M1-N4,M4 from the coordinates of the known object 1002. The devices 1001 are subsequently commissioned on to a network as described above. The results of the identification and locating process are provided on the display 1021.

Figure 11:
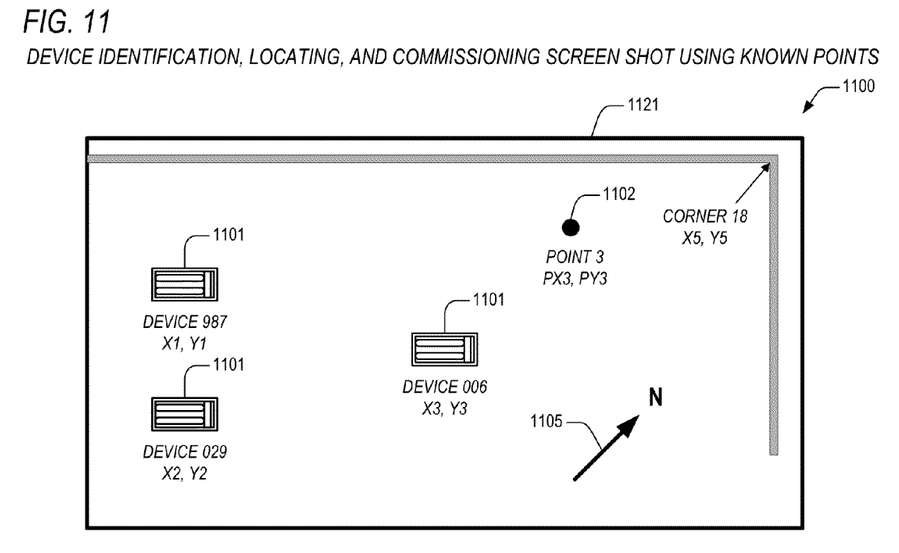
FIG. 11 is a block diagram featuring a screen shot from the display of the video recording device of FIG. 10.

Turning to FIG. 11, a block diagram is presented featuring a screen shot 1121 from the display 1021 of the video recording device 1020 of FIG. 10. The shot 1021 shows three device icons 1101 along with their unique identification numbers DEVICE 987, DEVICE 029, DEVICE 006, and corresponding precise coordinates X1,Y1-X3,Y3 as have been determined by demultiplexing and decoding their simultaneously transmitted optical signals. The coordinates X1,Y1-X3,Y3 may alternatively be expressed as longitudes and latitudes in accordance with conventional terms. Since precise locations are determined for each of the devices 1001, the screen shot 1121 shows the icons 1101 relatively positioned in the display 1021. In addition, the screen shot 1121 depicts a known object 1102 along with its identification POINT 3 and location coordinates PX3, PY3. The screen shot 1121 further shows a corner icon identification CORNER 18 and coordinates X5, Y5. In the event that the recording device 1020 includes an orientation element, an orientation icon 1105 is shown in the screen shot 1121 depicting a reference direction N. The screen shot 1121 can then be overlayed onto a floor plan whose orientation is known. In one embodiment the one or more application programs include algorithms which will then place the screen shot 1121 with the proper orientation and size for the floor plan along with the proper identification and locations of the devices 1101.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. An apparatus for concurrently identifying and commissioning a plurality of devices, the apparatus comprising:
   a video recording device, configured to record and process a plurality of video images of the plurality of devices, and configured to determine identification information and a geolocation corresponding to each of the plurality of devices, wherein said geolocation is determined by combining known coordinates and dimensions of an object within said plurality of video images, and a location of said each of the plurality of devices relative to said video recording device, and wherein said plurality of video images comprises unique encoded luminous transmissions simultaneously transmitted from said each of the plurality of devices; and
   a gateway device, coupled to said video recording device and the plurality of devices, configured to receive said identification information, and configured to commission said each of the plurality of devices onto a network.

2. The apparatus as recited in claim 1, wherein said each of the plurality of devices transmits said unique encoded luminous transmissions by modulating luminous emittance according to a coding scheme that is employed by said network.

3. The apparatus as recited in claim 2, wherein one or more of the plurality of devices comprise light fixtures that may be directed to emit electromagnetic transmissions in the visible spectrum.

4. The apparatus as recited in claim 2, wherein said video recording device comprises one or more application programs that are configured to demultiplex and decode said plurality of video images to determine said identification information.

5. The apparatus as recited in claim 4, wherein said video recording device comprises a smart cellular telephone.

6. The apparatus as recited in claim 4, wherein said video recording device comprises a tablet computer.

7. The apparatus as recited in claim 4, wherein said video recording device comprises:
   a Global Positioning System (GPS) receiver, configured to provide positional information to said one or more application programs, whereby said one or more application programs determine an estimated physical location for said each of the plurality of devices.

8. An apparatus for concurrent identification and commissioning, the apparatus comprising:
   a video recording device, configured to record and process a plurality of video images of a plurality of light fixtures, and configured to determine identification information and a geolocation corresponding to each of said plurality of light fixtures, wherein said geolocation is determined by combining known coordinates and dimensions of an object within said plurality of video images, and a location of said each of the plurality of light fixtures relative to said video recording device, and wherein said plurality of video images comprises unique encoded luminous transmissions simultaneously transmitted from said each of said plurality of light fixtures; and
   a gateway device, coupled to said video recording device and said plurality of light fixtures, configured to receive said identification information, and configured to commission said each of said plurality of light fixtures onto a network.

9. The apparatus as recited in claim 8, wherein said each of said plurality of light fixtures transmits said unique encoded luminous transmissions by modulating luminous emittance according to a coding scheme that is employed by said network.

10. The apparatus as recited in claim 9, wherein one or more of said plurality of light fixtures comprise fluorescent light fixtures that may be directed to emit electromagnetic transmissions in the visible spectrum.

11. The apparatus as recited in claim 9, wherein said video recording device comprises one or more application programs that are configured to demultiplex and decode said plurality of video images to determine said identification information.

12. The apparatus as recited in claim 11, wherein said video recording device comprises a smart cellular telephone.

13. The apparatus as recited in claim 11, wherein said video recording device comprises a tablet computer.

14. The apparatus as recited in claim 11, wherein said video recording device comprises:
   a Global Positioning System (GPS) receiver, configured to provide positional information to said one or more application programs, whereby said one or more application programs determine an estimated physical location for said each of said plurality of light fixtures.

15. A method for concurrently identifying and commissioning a plurality of devices, the method comprising:
recording and processing a plurality of video images of the plurality of devices to determine identification information and a geolocation corresponding to each of the plurality of devices, wherein the geolocation is determined by combining known coordinates and dimensions of an object within the plurality of video images, and a location of the each of the plurality of devices relative to the video recording device, and wherein the plurality of video images comprises unique encoded luminous transmissions simultaneously transmitted from the each of the plurality of devices; and
via a gateway device, receiving the identification information, and commissioning the each of the plurality of devices onto a network.

16. The method as recited in claim 15, wherein the each of the plurality of devices transmits the unique encoded luminous transmissions by modulating luminous emittance according to a coding scheme that is employed by the network.

17. The method as recited in claim 16, wherein one or more of the plurality of devices comprise light fixtures that may be directed to emit electromagnetic transmissions in the visible spectrum.

18. The method as recited in claim 16, said recording and processing comprise executing one or more application programs that are configured to demultiplex and decode the plurality of video images to determine the identification information.

19. The method as recited in claim 16, wherein the one or more application programs are disposed in a smart cellular telephone.

20. The method as recited in claim 16, wherein the one or more application programs are disposed in a tablet computer.

21. The method as recited in claim 18, wherein said recording and processing further comprise providing positional information to the one or more application programs, whereby the one or more application programs determine an estimated physical location for the each of the plurality of devices.

* * * * *